(12) United States Patent
Eckhardt et al.

(10) Patent No.: US 7,030,931 B2
(45) Date of Patent: Apr. 18, 2006

(54) VIDEO SERIALIZER/DESERIALIZER WITH EMBEDDED AUDIO SUPPORT

(75) Inventors: Ryan Eckhardt, Kitchener (CA); Gareth Heywood, Burlington (CA); John Hudson, Burlington (CA)

(73) Assignee: Gennum Corporation, (CA)

( * ) Notice: Subject to any disclaimer, the term of this patent is extended or adjusted under 35 U.S.C. 154(b) by 582 days.

(21) Appl. No.: 10/354,875

(22) Filed: Jan. 30, 2003

(65) Prior Publication Data

US 2003/0142233 A1 Jul. 31, 2003

Related U.S. Application Data

(60) Provisional application No. 60/353,089, filed on Jan. 30, 2002.

(51) Int. Cl.
*H04N 9/475* (2006.01)

(52) U.S. Cl. .................. 348/515; 348/512; 348/465

(58) Field of Classification Search ................ 348/500, 348/512, 513, 515, 465; H04N 9/475, 5/04
See application file for complete search history.

(56) References Cited

U.S. PATENT DOCUMENTS

| 5,506,627 | A | | 4/1996 | Ciardi |
| 6,055,021 | A | * | 4/2000 | Twitchell .................. 348/513 |
| 6,085,257 | A | | 7/2000 | Ducaroir et al. |

FOREIGN PATENT DOCUMENTS

GB 2338383 12/1999

OTHER PUBLICATIONS

Fibush, David K., "Integrated Digital Aduio into the Serial Digital Video Signal", 8012 SMPTE Journal, Sep. 1994; pp. 574-578, XP 445483.
Reynolds, Keith Y., et al., "Multiplexing and Demultiplexing Digital Aduio and Video in Today's Digital Environment", SMPTE Journal, Oct. 1993, pp. 905-909, XP 409174A.

(Continued)

*Primary Examiner*—Sherrie Hsia
(74) *Attorney, Agent, or Firm*—Jones Day

(57) ABSTRACT

An auto-configurable video deserializer with embedded audio support includes a video core, a clock generator and an audio core. The video core receives a serial video signal of an unknown video standard, converts the serial video signal into a parallel video signal, and decodes the parallel video signal to identify the unknown video standard and generate one or more auto-configuration signals. The clock generator generates an audio clock signal. The audio core is coupled to the video core and the clock generator, and receives the parallel video signal and one or more auto-configuration signals from the video core and receives the audio clock signal from the clock generator. The audio core uses the auto-configuration signal(s) to automatically locate and extract audio data from within ancillary space of the parallel video signal and synchronizes the extracted audio data with the audio clock signal to generate an audio output signal.

56 Claims, 5 Drawing Sheets

OTHER PUBLICATIONS

Takahashi M. et al., "A Scalable MPEG-4 Video Codec Architecture for IMT-2000 Multimedia Applications", ISCAS 2000, May 28-31, 2000, pp. 188-191, XP10502692.

Wilkinson, J.H., "The Serial Digital Data Interface (SDDI)", International Broadcasting Convention, Sep. 12-16, 1996, Conference Publication No. 428, pp. 425-430, XP 614021A.

National Semiconductor, "CLC030 Product Folder—SMPTE 292M/259M Digital Video Serializer with Ancilliary Data FIFO and Integrated Cable Driver", pp. 1-4 with attachment pp. 1-29, 2002 National Semiconductor Corporation.

National Semiconductor, "CLC031 Product Folder—SMPTE 292M/259M Digital Video Serializer/Descrambler with Video and Ancilliary Data FIFOs", pp. 1-3 with attachment pp. 1-30, 2002 National Semiconductor Corporation.

* cited by examiner

VIDEO SERIALIZER/DESERIALIZER WITH EMBEDDED AUDIO SUPPORT

CROSS-REFERENCE TO RELATED APPLICATION

This application claims priority from and is related to the following prior application: "Video Serializer/Deserializer Having an Embedded Audio CODEC," U.S. Provisional Application No. 60/353,089, filed Jan. 30, 2002. This prior application, including the entire written description and drawing figures, is hereby incorporated into the present application by reference.

FIELD

The technology described in this patent application relates generally to the field of digital audio/video signal processing. More particularly, the application describes an auto-configurable video deserializer with embedded audio support and a video serializer with embedded audio support.

BACKGROUND

Video serializer and deserializers that convert video signals between the serial and parallel domains are known in this art. Video deserializers, however, are typically discrete devices that cannot extract embedded audio data from a video stream without the use of a separate audio extracting device, which is typically pre-configured for a known video standard. Similarly, video serializers are typically discrete devices that cannot embed audio data into a video stream without the use of a separate, pre-configured audio embedding device.

SUMMARY

An auto-configurable video deserializer with embedded audio support includes a video core, a clock generator and an audio core. The video core receives a serial video signal of an unknown video standard, converts the serial video signal into a parallel video signal, and decodes the parallel video signal to identify the unknown video standard and generate one or more auto-configuration signals. The clock generator generates an audio clock signal. The audio core is coupled to the video core and the clock generator, and receives the parallel video signal and one or more auto-configuration signals from the video core and receives the audio clock signal from the clock generator. The audio core uses the auto-configuration signal(s) to automatically locate and extract audio data from within ancillary space of the parallel video signal and synchronizes the extracted audio data with the audio clock signal to generate an audio output signal.

A video serializer with embedded audio support includes an audio core, a video core and a cable driver fabricated on a single integrated circuit. The audio core receives a parallel video input signal having ancillary space, an audio data input signal, and one or more configuration signals. The audio core then embeds the audio data input signal into a location within the ancillary space of the parallel video input signal to generate a parallel video signal with embedded audio. The configuration signals are processed by the audio core to identify the location within the ancillary space of the parallel video input signal. The video core is coupled to the audio core, and receives the parallel video signal with embedded audio from the audio core and also receives a video clock signal. The video core then converts the parallel video signal with embedded audio into a serial video signal and synchronizes the serial video signal with the video clock signal to generate a reclocked serial video signal. The cable driver is coupled to the video core, and receives the reclocked serial video signal from the video core and also receives one or more configuration signals. The configuration signals are processed by the cable driver to generate a serial video output signal from the reclocked serial video signal that complies with a pre-selected video standard.

DETAILED DESCRIPTION

Figure 1:
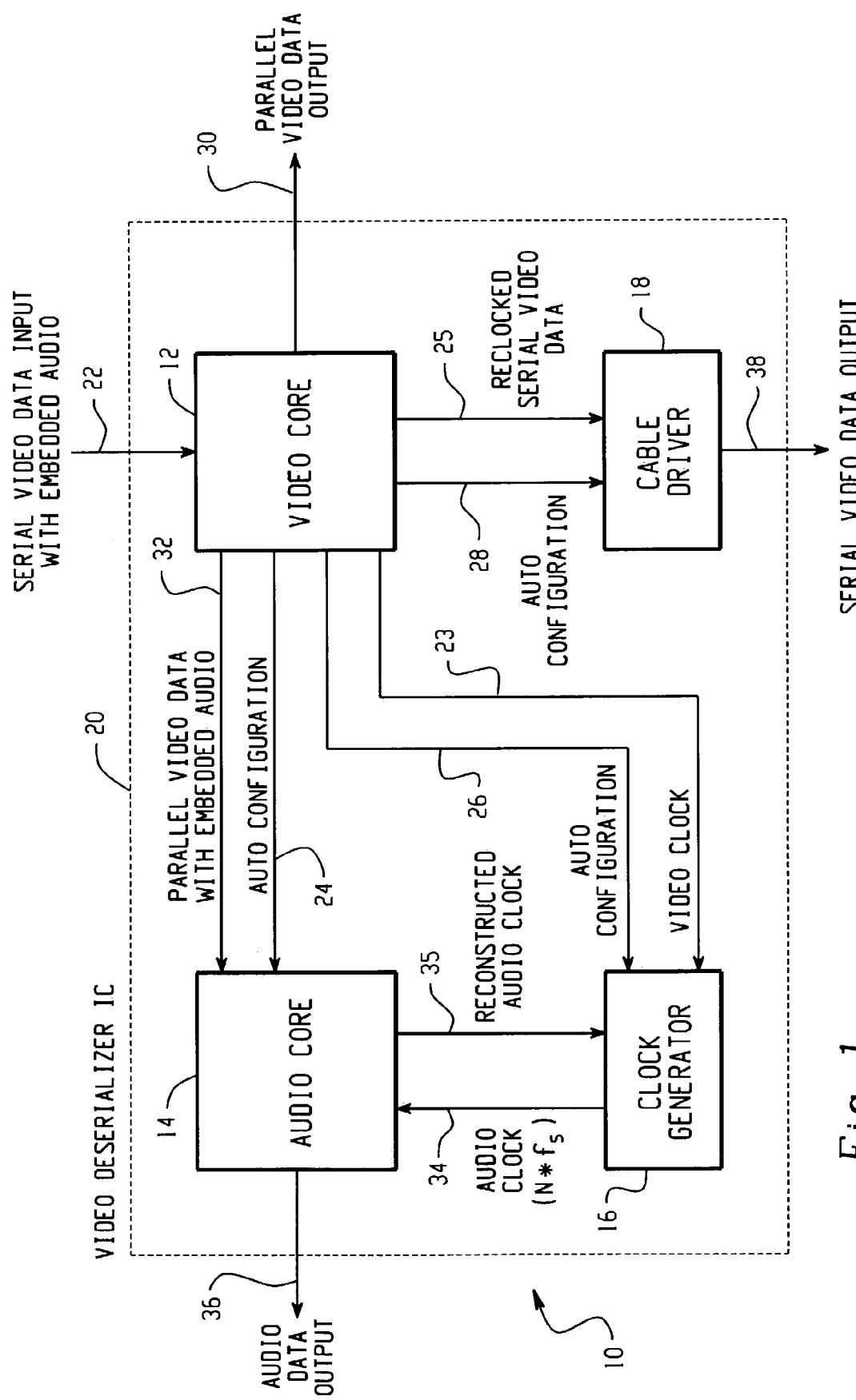
FIG. 1 is a block diagram of an exemplary auto-configurable video deserializer with embedded audio support.

Referring now to the drawing figures, FIG. 1 is a block diagram of an exemplary auto-configurable video deserializer 10 with embedded audio support. The deserializer 10 includes a video core 12, an audio core 14, a clock generator 16, and a cable driver 18. The deserializer 10 is preferably included on a single integrated circuit (IC) 20. Operationally, the descrializer 10 receives a serial video signal 22, decodes the structure of the signal 22 to determine the video standard, and automatically configures itself based on the standard. In addition, the deserializer 10 converts the serial video signal 22 into a parallel video signal and extracts any embedded audio signals.

The video core 12 receives the serial video signal 22 which, depending upon the video standard, may include embedded audio signals or other types of embedded data. For example, two common serial video standards used to transmit video signals are the SMPTE standard and the DVB-ASI standard. A SMPTE video signal includes ancillary space (see FIG. 2) which may be used to embed audio signals or other types of data. A DVB-ASI video signal, however, typically does not support embedded audio.

Upon receiving the serial video signal 22, the video core 12 recovers a video clock signal 23 from the serial video signal 22 and locks the incoming serial video signal 22 in phase with the recovered video clock signal 23 to generate a reclocked serial video signal 25. In addition, the video core 12 may detect when the incoming serial video signal 22 is locked in phase with the video clock signal 23, and generate auto-configuration signals 24, 26, 28 to indicate that the incoming video signal 22 is locked in phase. The reclocking and auto-configuration functions of the video core 12 are described in more detail below with reference to FIG. 3.

Once the serial video signal 22 has been reclocked, the video core 12 deserializes the reclocked video signal to generate a parallel video signal and analyzes the parallel video signal to determine the video standard, as described in more detail below. For example, the video core 12 may first determine if the serial video signal 22 is a SMPTE signal or a DVB-ASI signal. If the serial video signal 22 is a SMPTE signal, then the video core 12 may further analyze the video signal to determine if it is a high-definition or a standard-definition SMPTE signal and also to determine the particular high-definition or standard-definition SMPTE standard used to transmit the signal 22. It should be understood, however, that the video core 12 could also be configured to detect video standards other than SMPTE or DVB-ASI signals and to automatically configure the deserializer 10 accordingly.

In addition to detecting the video standard of the serial video signal 22, the video core 12 may also determine other configuration information specific to the particular standard. For example, the video core 12 may determine the data rate and slew rate of the video signal 22, blanking data indicating the size and location of ancillary data within the video signal 22, whether the video signal 22 is a progressive video signal or an interlaced video signal, and other information relating to the raster structure of the video signal 22. This configuration information may, for example, be determined by analyzing additional data embedded within the serial video signal 22, or may be determined based on known characteristics of the particular video standard. The configuration information is then output from the video core 12 as auto-configuration signals 24, 26, 28 coupled to the audio core 14, clock generator 16, and cable driver 18, as described below. In addition, the configuration information may also be stored to a memory device, such as a register, and transmitted as an output that indicates the type of serial video signal 22 currently being received by the deserializer 10.

After deserialization, the video core 12 further processes the parallel video signal, as described below with reference to FIG. 3, and generates a parallel video data output signal 30. In addition, if the video core 12 determines that the video signal includes embedded audio, or at least determines that the video standard supports embedded audio, then the parallel video data with embedded audio 32 is output to the audio core 14 along with one or more auto-configuration signals 24, as described below.

The clock generator 16 receives the video clock 23 and one or more auto-configuration signals 26 from the video core 12 and generates an audio clock signal 34. The auto-configuration signals 26 received from the video core 12 could include, for example, a phase-locked signal indicating that the serial video input 22 is locked in phase with the video clock signal 23, a data rate signal indicating the data rate of the video signal 32, and other configuration information relevant to the operation of the clock generator 16.

In operation, the clock generator 16 generates a standard-rate audio clock signal 34 that is synchronized with the video clock input signal 23. The audio clock signal 34 is preferably generated at a fixed multiple (N) of the fundamental audio sampling rate ($f_s$), which is typically a multiple of 48 kHz. The clock generator 16 may, for example, be a direct digital period synthesizer that selects a division ratio based on the data rate signal 26 from the video core 12, and multiplies the video clock signal 23 by the division ratio to generate the audio clock signal 34. The division ratio is preferably selected such that the resulting audio clock signal 34 has a frequency that is a multiple of the fundamental audio sampling rate ($N*f_s$).

The audio core 14 receives the parallel video data with embedded audio 32 and one or more auto-configuration signals 24 from the video core 12, and receives the audio clock signal 34 from the clock generator 16. The auto-configuration signals 24 received from the video core 12 could include, for example, a phase-locked signal indicating that the serial video input 22 is locked in phase, a video standard signal indicating the standard of the video signal 32, a data rate signal indicating the data rate of the video signal 32, a blanking data signal that indicates the size and location of audio data embedded within the ancillary space of the video signal 32, data indicating whether the video signal 32 is progressive or interlaced video, and other configuration information relevant to the operation of the audio core 14.

In operation, the audio core 14 extracts audio data from the ancillary space of the parallel video signal 32 and synchronizes the audio data with the audio clock signal 34 to generate an audio data output signal 36. The audio core 14 utilizes the auto-configuration data 24 to locate and extract audio data within the raster structure of the video signal 32 (see FIG. 2), which may vary depending upon the video standard. The auto-configuration signals 24 therefore allow the audio core 14 to automatically locate and extract audio data from multiple video standards. In addition, the audio core 14 may receive a phase-locked configuration signal 24 from the video core 12 that enables the audio data output signal 36 once the incoming serial video signal 22 is locked in phase with the video clock signal 23, and thus helps prevent the audio core 14 from generating corrupt audio output.

In one embodiment, the audio core 14 may also determine from the auto-configuration data 24 whether the detected video standard of the serial video input signal 22 supports embedded audio clock phase data. For example, audio clock phase information 35 can be embedded within the ancillary space of a high-definition SMPTE signal in order to reconstruct the audio clock for the embedded audio data. If the audio core 14 determines that embedded audio clock phase data is supported, then the audio core 14 uses the auto-configuration information 24 to automatically locate and extract the audio clock phase data from the ancillary space of the parallel video data 32 and generate a reconstructed audio clock signal 35. The clock generator 16 in this embodiment similarly determines from the auto-configuration data 26 whether the detected video standard supports embedded audio clock phase data. If embedded audio clock phase data is supported, then the clock generator 16 generates the audio clock signal 34 by multiplying the division ratio (N) by the reconstructed audio clock signal 35 instead of the video clock signal 23.

The cable driver 18 receives the reclocked serial video data signal 25 and one or more auto-configuration signals 28 from the video core 12, and generates a serial video data output signal 38. The auto-configuration signals 28 received from the video core 12 could include, for example, a phase-locked signal indicating that the serial video input 22 is locked in phase with the video clock 23, a slew rate signal indicating the required slew rate for the desired video standard, and other configuration information relating to the desired video standard of the serial video output signal 38.

In operation, the cable driver 18 processes the reclocked serial video data signal 25 to put the video signal into compliance with the video standard of the incoming video signal 22. For example, the cable driver 18 may use a slew rate auto-configuration signal 28 from the video core 12 to adjust the slew rate of the reclocked serial video data 25 in accordance with the applicable video standard. The auto-configuration signals 28 may therefore allow the cable driver 18 to generate the serial video data output signal 38 in compliance with the video standard of the incoming video signal 22 without requiring additional user input. In addition, a phase-locked auto-configuration signal 28 may help prevent the deserializer 10 from outputting corrupt serial data by only enabling the serial video data output signal 38 once the incoming serial video signal 22 is locked in phase with the video clock signal 23.

Figure 2:
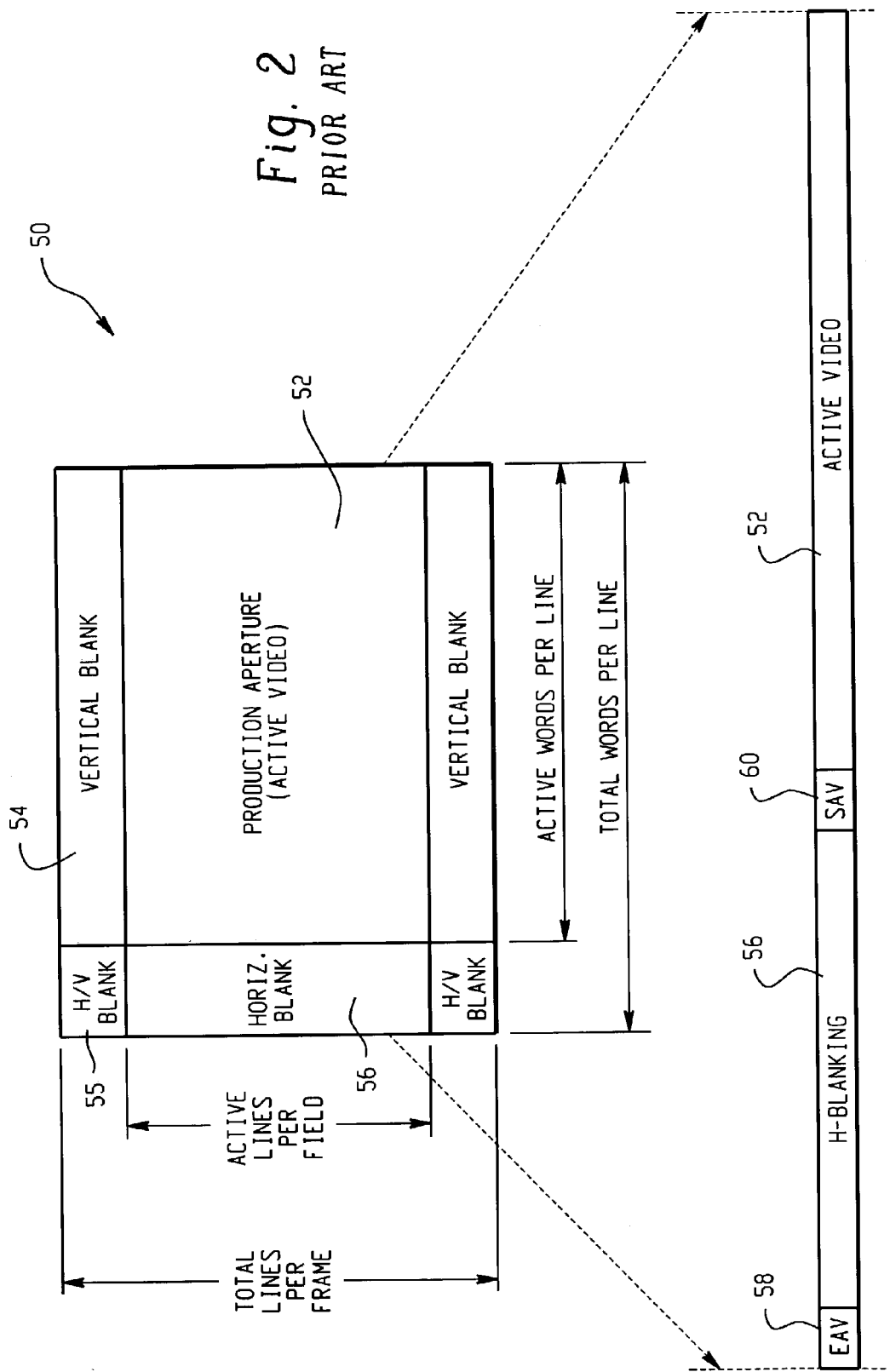
FIG. 2 shows a typical raster structure for serial video data.

FIG. 2 shows a typical raster structure 50 for a progressive serial video data stream. Each frame 50 of the video stream includes a production aperture portion 52 for active video data and a plurality of blanking portions 54, 55, 56 that include ancillary space. In addition, the various portions of the raster structure 50 are separated by timing reference signals (TRSs). For example, FIG. 2 illustrates one line from the raster structure 50 that includes an EAV (End of Active Video) TRS, a horizontal blanking portion 56, a SAV (Start of Active Video) TRS, and an active video portion 52. Typically, audio data and other ancillary data is embedded within the ancillary space of the horizontal blanking portion 56.

Figure 3:
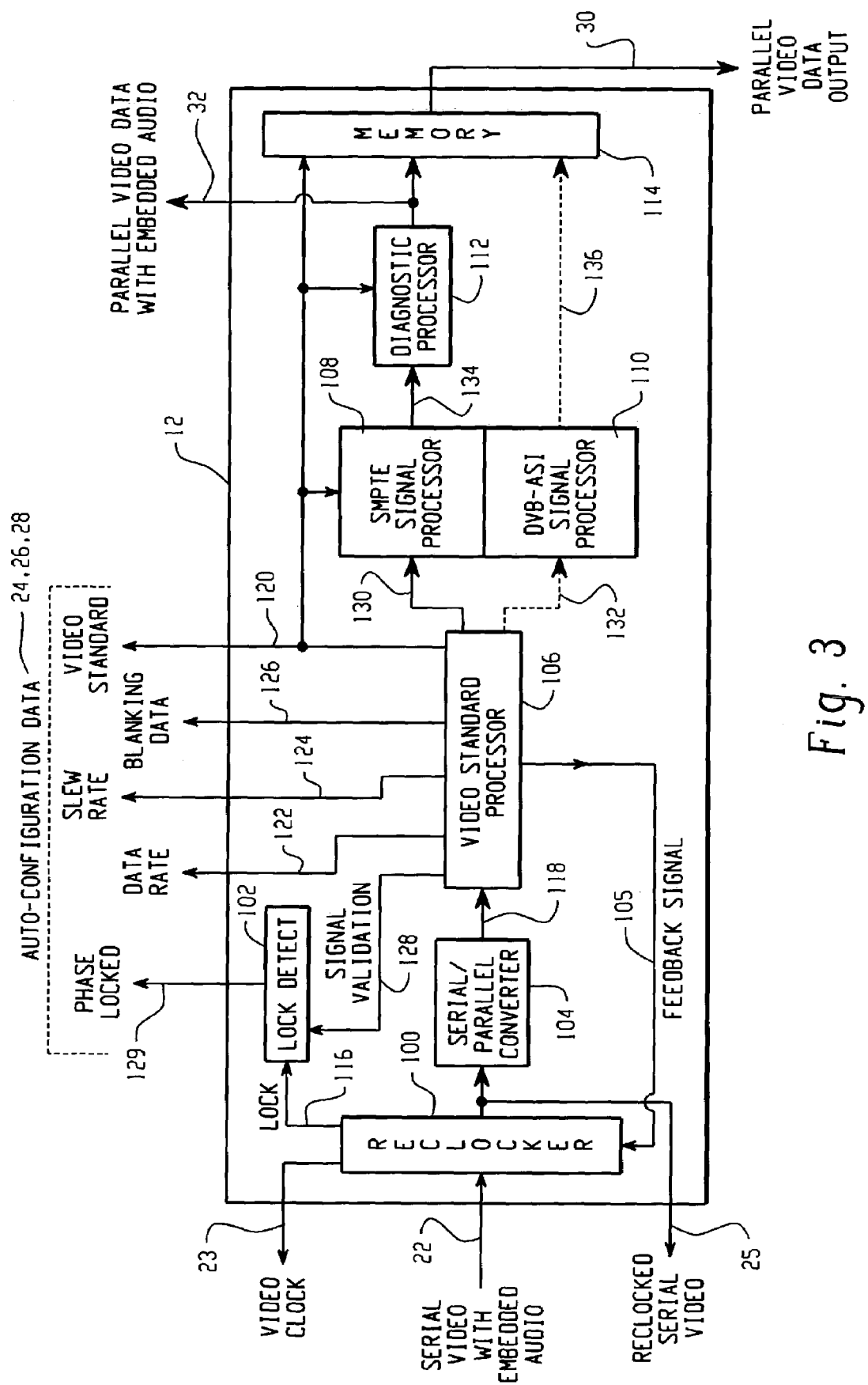
FIG. 3 is a block diagram of an exemplary video core for the auto-configurable video deserializer of FIG. 1.

FIG. 3 is a block diagram of an exemplary video core 12 for the auto-configurable video deserializer 10 of FIG. 1. The video core 12 includes a reclocker circuit 100, a lock detect circuit 102, a serial-to-parallel converter 104 and a video standard processor 106. The video core 12 also includes a SMPTE signal processor 108, a DVB-ASI signal processor 110, a diagnostic processor 112 and a memory device 114.

The serial video data input 22 to the video core 12 is received by the reclocker circuit 100 which recovers the video clock signal 23 and synchronizes the video input signal 22 with the video clock signal 23 to dejitter the video signal 23 and generate the reclocked serial video data signal 25. In addition, the reclocker circuit 100 detects when the reclocked serial video data signal 25 is locked in phase with the video clock signal 23 and generates a lock signal 116 to indicate that the signals 23, 25 are locked. The reclocker circuit 100 may also receive a feedback signal 105, described in more detail below, that helps prevent the reclocker circuit 100 from locking to a false signal.

The reclocked serial video signal 25 generated by the reclocker circuit 100 is output to the cable driver 18, as described above, and is also coupled as an input to the serial-to-parallel converter 104. The serial-to-parallel converter 104 converts the video signal from the serial domain into the parallel domain and generates a parallel video signal 118 that is coupled to the video standard processor 106.

The video standard processor 106 processes the parallel video signal 118 to detect the video standard and generates a video standard output signal 120 as an auto-configuration signal 24, 26, 28 that indicates the detected video standard of the incoming signal 118. In order to detect the video standard of the signal 118, the video standard processor 106 decodes the raster structure of the video signal 118 to identify features of the raster structure unique to a particular video standard. For example, SMTPE video signals include unique raster structure features not present in DVB-ASI signals. Similarly, high-definition SMTPE video includes video raster structure characteristics not present in standard-definition SMPTE video signals. By comparing particular raster structure characteristics identified in the decoded signal with a database of known raster structure characteristics, the video standard processor 106 is able to identify the video standard of the parallel video signal 118 and generate the video standard output signal 120 accordingly.

In addition, the video standard processor 106 may also generate additional auto-configuration signals 24, 26, 28, such as a data rate signal 122 indicating the data rate of the incoming signal 118, a slew rate signal 124 indicating the slew rate of the signal 118, and a blanking data signal 126 indicating the size and position of any audio data embedded within the blanking portions of the video signal 118 (see FIG. 2). The video standard processor 106 may generate these additional auto-configuration signals 122, 124, 126 by further processing the incoming video signal 188, or from stored data relating to the detected video standard 120 of the incoming signal 118. For example, the video standard processor 106 may access ancillary data within the incoming video signal 118 to determine the data rate, slew rate, and blanking information, or may include a database that correlates video standards with their standardized data rates, slew rates, etc.

The video standard processor 106 may also generate a validation signal 128 to indicate that a valid video standard has been detected for the incoming video signal 22. The validation signal 128 is coupled to the lock detect circuit 102 along with the lock signal 116 from the reclocker circuit 100. The lock detect circuit 102 generates a phase-locked signal 129 to indicate that the serial video input signal 22 is both locked in phase and includes a valid video standard. The phase-locked signal 116 may then be output as an auto-configuration signal 24, 26, 28 from the video core 12, as described above.

Similarly, the video standard processor 106 may generate a feedback signal 105 to the reclocker circuit 105, as described above, which indicates whether or not the reclocker circuit is locked to a valid serial input signal 22. This feedback loop between the reclocker 100 and the video standard processor 106 helps to ensure that the reclocker 100 does not falsely lock to a harmonic of the true input signal. For example, a DVB-ASI input signal with a 27 Mb/s data rate includes many K28.5 sync characters, and therefore may produce a harmonic. Without the feedback signal 105, the reclocker circuit 100 would likely falsely lock to the harmonic when receiving such a DVB-ASI signal.

Once the incoming video signal 118 has been processed to generate the auto-configuration signals 24, 26, 28, the video standard processor 106 outputs a parallel video signal 130, 132 to either the SMPTE signal processor 108 or the DVB-ASI signal processor 110, depending upon the detected video standard. If the video standard processor 106 determines that the incoming signal 118 is a SMPTE signal, then the parallel SMPTE video signal 130 is output from the video standard processor 106 to the SMPTE signal processor 108. If, however, the video standard processor 106 detects a DVB-ASI signal, then the parallel DVB-ASI video signal 132 is coupled to the DVB-ASI signal generator 110. It should be understood, however, that the video core 12 could also be configured to detect and process video signals encoded with video standards other than SMPTE or DVB-ASI.

The SMPTE signal processor 108 receives SMPTE video signals 130, which it descrambles and word-aligns in accordance with the detected SMPTE video standard 120 to generate a descrambled parallel video signal 134. The descrambled parallel video signal 134 may then be further processed by the diagnostic processor 112 to generate the parallel video data output 32. The diagnostic processor 112 may be automatically configured by the video standard signal 120 to detect and correct errors in the SMPTE signal 134, detect the presence of other ancillary data, such as closed-captioning or meta data, within in the SMPTE signal 134, and perform other SMPTE diagnostic functions appropriate to the detected SMPTE video standard 120. The parallel video data output 32 from the diagnostic processor 112 is then output from the video core 12 to the audio core 13, as described above with reference to FIG. 1. In addition, the parallel video data output 32 is buffered in the memory device 114 and output as the parallel video data output 30.

The DVB-ASI signal processor 110 receives DVB-ASI signals 132, which it decodes and word-aligns in accordance with the DVB-ASI standard to generate a decoded parallel video signal 136. Because the DVB-ASI standard does not support embedded audio or diagnostic processing, however, the decoded parallel video signal 136 from the DVB-ASI signal processor 110 is buffered in the memory device 114 and output as the parallel video data output signal 30 without further processing by the diagnostic processor 112 or audio core 14.

In addition to buffering the parallel video data output 30, the memory device 114 is preferably auto-configurable and multi-purpose. For example, upon detecting a DVB-ASI signal, the video standard processor 106 may automatically configure the memory device 114 as a clock rate interchange for extracting compressed video data from the DVB-ASI signal and discarding the K28.5 sync characters. The memory device 114 could also be automatically configured by the video standard processor 106 to auto-phase the parallel video data output 30 with the parallel output of another device. In this case, the video standard processor 106 could auto-configure the memory device 114 with line length and other properties of the detected video standard of the serial input signal 22. In another example, the memory device 114 could be automatically configured by the video standard processor 106 for extracting ancillary data from the ancillary space of the parallel video data 130.

Figure 4:
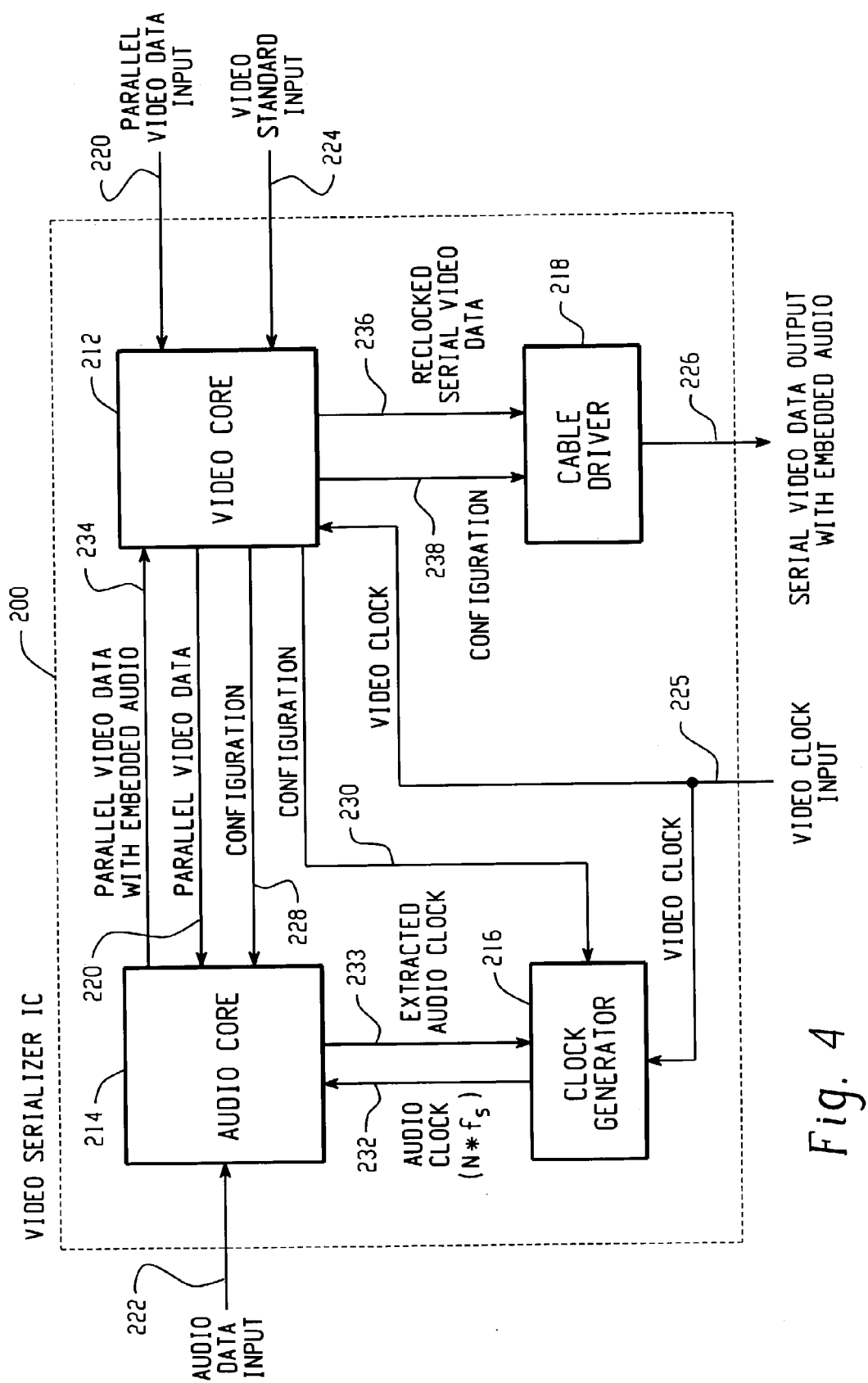
FIG. 4 is a block diagram of an exemplary video serializer with embedded audio support.

FIG. 4 is a block diagram of an exemplary video serializer 200 with embedded audio support. The serializer 200 includes a video core 212, an audio core 214, a clock generator 216, and a cable driver 218. The serializer 200 is preferably included on a single integrated circuit (IC). Operationally, the serializer 200 receives a parallel video data input signal 220, an audio data input 222, and a video standard input signal 224, embeds the audio signal 222 within the ancillary space of the video signal 220, and encodes the resultant signal in accordance with the video standard 224 to generate a serial video data output signal with embedded audio 226.

The video core 212 receives the parallel video data input signal 220 from an external device, and also receives a video clock signal 225 and a video standard input signal 224 that indicates the desired video standard for transmission. The parallel video data signal 220 is sent from the video core 212 to the audio core 214 along with one or more configuration signals 228 generated by the video core 212. The configuration signals 228 may, for example, include the video standard signal 224 and other configuration information derived from the video standard signal 224, such as a data rate signal indicating the standard video data rate, a blanking data signal indicating where the audio data is to be placed within the raster structure of the video data, data indicating whether the video signal is progressive or interlaced video, and other information relevant to the operation of embedding audio data into the parallel video signal 220. The configuration information 228 transmitted to the audio core 214 is preferably determined by the video core 212 based on the video standard input 224. In one alternative embodiment, however, the audio core 214 may receive only the video standard in the configuration information 228 from the video core 212, and may then derive any other necessary configuration information from the video standard.

The clock generator 216 receives the video clock signal 225 and a configuration signal 230 from the video core 212. The configuration signal 230 transmitted from the video core 212 to the clock generator 216 may, for example, include a data rate signal indicating the standard data rate for the video signal. The clock generator 216 operates similarly to the clock generator 16 described above with reference to FIG. 1, and generates an audio clock signal 232. The audio clock signal 232 is generated at a fixed multiple (N) of the fundamental audio sampling rate ($f_s$), by multiplying the video clock signal 225 by a division ratio derived from the data rate configuration signal 230 from the video core 212.

The audio core 214 receives an audio data input signal 222 from an external device, along with the audio clock signal 232, configuration data 228 and parallel video data 220. The configuration data 228 is used by the audio core 214 to determine the size and location of ancillary space within the raster structure of the parallel video data 220 that is available for embedded audio. The audio core 214 uses the audio clock signal 232 to sample the audio data input signal 222, and embeds the sampled audio data within designated ancillary space in the parallel video data 220 to generate a parallel video signal with embedded audio 234. The parallel video signal with embedded audio 234 is then fed back to the video core 212 for further processing.

In one embodiment, the audio core 222 may also determine from the configuration data 228 whether the desired video standard supports embedding audio clock phase data into the ancillary space of the parallel video data 220, for instance in the case of a high-definition SMPTE video standard. If embedded audio clock phase data is supported by the video standard, then the audio core 222 extracts the fundamental clock sampling signal ($f_s$) from the audio data input signal 222 to generate an extracted audio clock signal 233. In this embodiment, the clock generator 216 similarly determines from the configuration data 230 whether the desired video standard supports embedding audio clock phase data, and if so, generates the audio clock signal 232 by multiplying the division ratio (N) by the extracted audio clock signal 233 instead of the video clock 225. In addition, if supported by the video standard, the audio core 214 embeds audio clock phase data within the ancillary space of the parallel video data based on the audio clock signal 232.

Once the video core 212 receives the parallel video signal with embedded audio 234, it encodes or scrambles the video data in accordance with the designated video standard 224 and converts the formatted video into a serial video stream. The serial video stream is locked in phase with the video clock signal 225 to generate a reclocked serial video data signal 236 that is coupled to the cable driver 218.

The cable driver 218 receives the reclocked serial video data signal 236 from the video core 212 along with one or more configuration signals 238, and generates the serial video data output signal with embedded audio 226. The configuration signals 238 from the video core 212 may include, for example, a slew rate signal and other information relating to the designated video standard that is used by the cable driver 218 to put the outgoing video stream into compliance with the video standard requirements.

In one embodiment, the video core 212 may include an auto-configurable memory device similar to the memory device 114 in the deserializer video core 12 described above. For example, if the video standard input 224 indicates that the parallel video input 220 is DVB-ASI, then the memory device in the video core 212 may be automatically configured for use as a clock rate interchange for inserting compressed video data and K28.5 sync characters into the DVB-ASI signal 220. The memory device in the video core 212 could also be automatically configured according to the video standard input 224 to auto-phase the serial output 226 with the serial output of another device (not shown). In another example, the memory device in the video core 212 could be automatically configured based on the video standard input 224 for embedding ancillary data into the ancillary space of the parallel video data 220.

Figure 5:
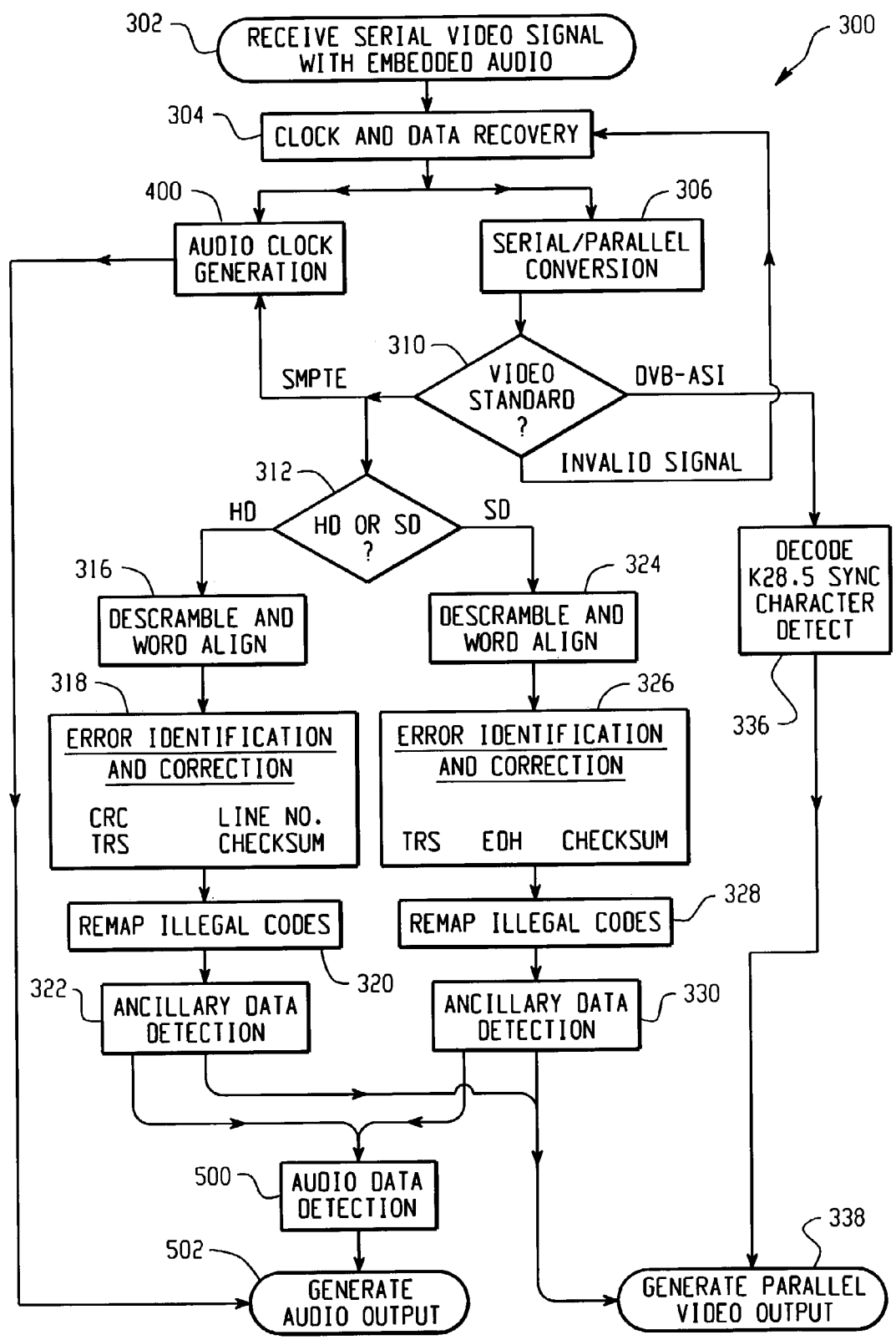
FIG. 5 is a flow diagram illustrating an exemplary method of automatically extracting audio data from a serial video data stream of an unknown video standard.

FIG. 5 is a flow diagram 300 illustrating an exemplary method of automatically extracting audio data from a serial video data stream of an unknown video standard. Steps 302-338 may, for example, be performed by the video core 12 described above with reference to FIGS. 1 and 3. Step 400 may, for example, be performed by the clock generator 16 described above with reference to FIG. 1. Steps 500 and 502 may, for example, be performed by the audio core 14 described above with reference to FIG. 1.

The method begins at step 302 with the receipt of a serial video signal having embedded audio data. At step 304, a video clock signal is recovered from the serial video signal and the serial video signal is dejittered by synchronizing the serial video signal with the recovered video clock signal. In this step, feedback from step 310 is used to help ensure that the recovered video clock is locked in synchronization with the correct incoming serial video signal, and not falsely locked to a harmonic. The dejittered serial video signal is then converted from the serial domain into the parallel domain in step 306.

After the video signal has been converted into the parallel domain, the raster structure of the video signal is decoded in steps 310 and 312 to determine the video standard of the signal, as described above. In step 310, it is determined whether the video standard is a SMPTE standard or a DVB-ASI standard. If no valid video standard is detected at step 310, however, then a feedback signal is returned to step 304, indicating that the signal is invalid and that the recovered video clock signal may therefore be locked in phase with a harmonic of the true video signal. If the video standard is a SMPTE standard, then in step 312, it is determined whether the video standard is a high-definition (HD) or a standard-definition (SD) SMPTE standard. It should be understood, however, that video standards other than the SMPTE or DVB-ASI standards could also be detected.

If it is determined at step 310 that the video standard is a DVB-ASI standard, then at step 336 the parallel video signal is decoded, and the embedded K28.5 synchronization characters are identified in order to word-align the decoded signal. The decoded and word-aligned signal is buffered and output as a parallel video output signal at step 338.

If it is determined at step 312 that the video standard is a high-definition SMPTE standard, then the signal is processed in steps 316–322. At step 316, the parallel video signal is descrambled and word aligned in accordance with the detected high-definition video standard. In step 318, the known characteristics of the high-definition SMPTE standard are used to identify and correct signal errors. For example, CRC, TRS, line number and checksum errors can be detected and fixed in a high-definition SMPTE signal. In step 320, illegal codes in the high-definition SMPTE signal are detected and remapped. Then, in step 322, the ancillary space of the high-definition SMPTE signal is examined to detect and identify any embedded ancillary data other than audio.

If it is determined at step 312 that the video standard is a standard-definition SMPTE standard, then the signal is processed in steps 324–330. At step 324, the parallel video signal is descrambled and word aligned in accordance with the detected standard-definition video standard. In step 326, the known characteristics of the standard-definition SMPTE standard are used to identify and correct signal errors. For example, TRS, EDH and checksum errors can be detected and repaired in a standard-definition SMPTE signal. In step 328, illegal codes in the standard-definition SMPTE signal are detected and remapped. Then, in step 330, the ancillary space of the standard-definition video signal is examined to detect and identify any embedded ancillary data other than audio.

After the SMPTE signal has been processed in steps 316–322 or steps 324–330, the processed SMPTE signal is buffered and output as the parallel video output signal at step 338. In addition, the processed SMPTE signal is further processed at step 500 to detect audio data within the ancillary space of the video signal. The identified video standard from step 310 along with the recovered video clock signal from step 304 are used in step 400 to generate an audio clock signal that is synchronized with the video clock signal and has a frequency that is a fixed multiple of a fundamental audio sampling rate ($f_s$). Then, at step 502, the audio data identified in step 500 is extracted from the ancillary space of the video signal and synchronized with the audio clock signal from step 400 to generate an audio output signal.

This written description uses examples to disclose the invention, including the best mode, and also to enable a person skilled in the art to make and use the invention. The patentable scope of the invention is defined by the claims, and may include other examples that occur to those skilled in the art. For example, one alternative embodiment of the video deserializer shown in FIG. 1 may include one or more additional processing blocks that are automatically configured in accordance with the detected video standard to extract ancillary data other than audio data from the incoming video stream.

It is claimed:

1. An auto-configurable video deserializer, comprising:
a video core that receives a serial video signal of an unknown video standard, converts the serial video signal into a parallel video signal, and decodes the parallel video signal to identify the unknown video standard and generate one or more auto-configuration signals;
a clock generator that generates an audio clock signal; and
an audio core coupled to the video core and the clock generator that receives the parallel video signal and the one or more auto-configuration signals from the video core and receives the audio clock signal from the clock generator, wherein the audio core is automatically configured by the auto-configuration signals to locate and extract audio data from within ancillary space of the parallel video signal and to synchronize the extracted audio data with the audio clock signal to generate an audio output signal.

2. The auto-configurable video deserializer of claim 1, wherein the video deserializer is fabricated on a single integrated circuit (IC).

3. The auto-configurable video deserializer of claim 1, wherein the clock generator generates the audio clock signal as a function of a known clock signal.

4. The auto-configurable video deserializer of claim 1, wherein the clock generator receives at least one auto-configuration signal from the video core and is automatically configured by the auto-configuration signal to generate the audio clock signal in synchronization with the serial video signal.

5. The auto-configurable video deserializer of claim 1, wherein the video core recovers a video clock signal from the serial video signal, and wherein the clock generator receives the video clock signal from the video core and generates the audio clock signal as a function of the video clock signal.

6. The auto-configurable video deserializer of claim 5, wherein the clock generator receives at least one auto-configuration signal from the video core, determines a division ratio from the auto-configuration signal, and multiplies the video clock signal by the division ratio to generate the audio clock signal.

7. The auto-configurable video deserializer of claim 6, wherein the division ratio is determined such that a resulting data rate of the audio clock signal is a fixed multiple of a fundamental audio sampling rate.

8. The auto-configurable video deserializer of claim 7, wherein the fundamental audio sampling rate is 48 kHz.

9. The auto-configurable video deserializer of claim 1, wherein the audio core extracts audio clock phase data from within the ancillary space of the parallel video signal and generates a reconstructed audio clock signal from the audio clock phase data, and wherein the clock generator receives the reconstructed audio clock signal from the audio core and generates the audio clock signal as a function of the reconstructed audio clock signal.

10. The auto-configurable video deserializer of claim 1, wherein the clock generator includes a direct digital period synthesizer.

11. The auto-configurable video deserializer of claim 1, wherein the video core dejitters the serial video signal to generate a reclocked serial video signal.

12. The auto configurable video deserializer of claim 11, further comprising:
a cable driver coupled to the video core that receives the reclocked serial video signal and at least one auto-configuration signal from the video core, and processes the reclocked serial video signal based on the auto-configuration signal to generate a serial video output signal in compliance with the video standard identified by the video core.

13. The auto-configurable video deserializer of claim 11, wherein the video core recovers a video clock signal from the serial video signal and locks the serial video signal in phase with the video clock signal to generate the reclocked serial video signal.

14. The auto-configurable video deserializer of claim 13, wherein the video core detects when the serial video signal is locked in phase with the video clock signal and generates a phase-locked auto-configuration signal, wherein the phase-locked auto-configuration signal is coupled to the audio core and enables the audio output signal when the serial video signal is locked in phase with the video clock signal.

15. The auto-configurable video deserializer of claim 14, wherein the phase-locked auto-configuration signal is coupled to the clock generator and enables the audio clock signal when the serial video signal is locked in phase with the video clock signal.

16. The auto-configurable video deserializer of claim 1, wherein the video core determines from the identified video standard whether the serial video signal supports embedded audio, and if the serial video signal does not support embedded audio, then the video core bypasses the audio core.

17. The auto-configurable video deserializer of claim 1, wherein the one or more auto-configuration signals generated by the video core include a data rate signal that indicates the data rate of the serial video signal.

18. The auto-configurable video deserializer of claim 1, wherein the one or more auto-configuration signals generated by the video core include a slew rate signal indicating the slew rate of the serial video signal.

19. The auto-configurable video deserializer of claim 1, wherein the one or more auto-configuration signals generated by the video core include a blanking data signal that identifies the location of audio data within ancillary space of the parallel video signal.

20. The auto-configurable video deserializer of claim 1, wherein the one or more auto-configuration signals generated by the video core include a video standard signal that identifies the video standard of the serial video signal.

21. The auto-configurable video deserializer of claim 1, wherein the one or more auto-configuration signals generated by the video core include a signal indicating whether the serial video signal is a progressive video signal or an interlaced video signal.

22. The auto-configurable video deserializer of claim 1, wherein the video core identifies the unknown video standard by decoding the raster structure of the serial video signal and identifying at least one feature of the raster structure that is unique to a particular video standard.

23. The auto-configurable video deserializer of claim 1, wherein the video core comprises:
a serial-to-parallel converter that converts the serial video signal into the parallel video signal; and
a video standard processor coupled to the serial-to-parallel converter that decodes the parallel video signal to identify the unknown video standard and generate the one or more auto-configuration signals.

24. The auto-configurable video deserializer of claim 23, wherein the video core further comprises:
a reclocker circuit coupled to the serial-to-parallel converter that recovers a video clock signal from the serial video signal and locks the serial video signal in phase with the video clock signal to generate a reclocked serial video signal, wherein the serial-to-parallel converter receives the reclocked serial video signal from the reclocker circuit and converts the reclocked serial video signal into the parallel video signal.

25. The auto-configurable video descrializer of claim 24, wherein the reclocker circuit generates a lock signal that identifies when the serial video signal is locked in phase with the video clock signal.

26. The auto-configurable video deserializer of claim 25, wherein the video standard processor generates a validation signal that indicates whether a valid video standard has been identified for the serial video signal, and wherein the video core further comprises:
a lock detect circuit that receives the lock signal from the reclocker circuit and the validation signal from the video standard processor and that generates a phase-locked auto-configuration signal that indicates when the serial video signal is locked in phase with the video clock signal and a valid video standard has been identified for the serial video signal.

27. The auto-configurable video deserializer of claim 24, wherein the video standard processor generates a feedback signal if the unknown video standard cannot be identified, and wherein the feedback signal is received by the reclocker circuit and indicates to the reclocker circuit that the video clock is locked in phase with a false signal instead of the serial video signal.

28. The auto-configurable video deserializer of claim 23, wherein the video core further comprises:
a signal processor coupled to the video standard processor that receives the parallel video signal and a video standard auto-configuration signal from the video standard processor, wherein the signal processor descrambles the parallel video signal based on a video standard identified by the video standard auto-configuration signal.

29. The auto-configurable video deserializer of claim 28, wherein the signal processor is specific to a first type of video standard, and wherein the video core further comprises:
an additional signal processor specific to a second type of video standard and configured to decode the parallel video signal based on the second type of video standard, wherein the video standard processor couples the parallel video signal to either the signal processor or the additional signal processor based on the identified video standard of the serial video signal.

30. The auto-configurable video deserializer of claim 29, wherein the signal processor is specific to a SMPTE video standard and the additional signal processor is specific to a DVB-ASI video standard.

31. The auto-configurable video deserializer of claim 28, wherein the video core further comprises:
a diagnostic processor coupled to the signal processor and the video standard processor that receives the descrambled parallel video signal from the signal processor and receives the video standard auto-configuration signal from the video standard processor, wherein the diagnostic processor is automatically configured by the video standard auto-configuration signal to detect and correct errors in the descrambled parallel video signal.

32. The auto-configurable video deserializer of claim 31, wherein the diagnostic processor is automatically configured by the video standard auto-configuration signal to detect ancillary data other than audio data within the ancillary space of the descrambled parallel video signal.

33. The auto-configurable video deserializer of claim 28, wherein the video core further comprises:
a memory device coupled to the signal processor that buffers the descrambled parallel video signal and generates a parallel video data output.

34. The auto-configurable video deserializer of claim 33, wherein the memory device receives the video standard auto-configuration signal from the video standard processor, and wherein the memory device is automatically configured by the video standard auto-configuration signal to auto-phase the parallel video data output with a video output from an external device.

35. The auto-configurable video deserializer of claim 34, wherein the memory device is automatically configured with line length of the identified video standard.

36. The auto-configurable video deserializer of claim 33, wherein if the video standard processor identifies the unknown video standard as a DVB-ASI standard, then the memory device is automatically configured as a clock rate interchange for extracting compressed video data from the parallel video signal and discarding k28.5 synchronization characters.

37. The auto-configurable video deserializer of claim 33, wherein the memory device is automatically configured for extracting ancillary data from ancillary space within the parallel video signal.

38. A video serializer fabricated on a single integrated circuit, comprising:
an audio core that receives a parallel video input signal having ancillary space, an audio data input signal, and one or more configuration signals, and that embeds the audio data input signal into a location within the ancillary space of the parallel video input signal to generate a parallel video signal with embedded audio, wherein the configuration signals are processed by the audio core to identify the location within the ancillary space of the parallel video input signal;
a video core coupled to the audio core that receives the parallel video signal with embedded audio from the audio core and receives a video clock signal, and that converts the parallel video signal with embedded audio into a serial video signal and synchronizes the serial video signal with the video clock signal to generate a reclocked serial video signal; and
a cable driver coupled to the video core that receives the reclocked serial video signal from the video core and receives one or more configuration signals, wherein the configuration signals are processed by the cable driver to generate a serial video output signal from the reclocked serial video signal that complies with a pre-selected video standard.

39. The video serializer of claim 38, wherein the video core receives a video standard input signal that identifies the pre-selected video standard, and wherein the video core processes the video standard input signal to generate the one or more configuration signals received by the audio core and the cable driver.

40. The video serializer of claim 38, further comprising:
a clock generator coupled to the audio core that generates an audio clock signal as a function of a known clock signal;
wherein the audio core receives the clock signal and uses the clock signal to sample the audio data input signal that is embedded into the location within the ancillary space of the parallel video input signal.

41. The video serializer of claim 40, wherein the clock generator receives the video clock signal and generates the audio clock signal as a function of the video clock signal.

42. The video serializer of claim 41, wherein the clock generator receives one or more configuration signals, and wherein the clock generator determines a division ratio from the one or more configuration signals and multiplies the video clock signal by the division ratio to generate the audio clock signal.

43. The video serializer of claim 40, wherein the audio core extracts a clock signal from the audio data input signal, and wherein the clock generator receives the extracted clock signal from the audio core and generates the audio clock signal as a function of the extracted clock signal.

44. The video serializer of claim 43, wherein the clock generator determines a division ratio from the one or more configuration signals and multiplies the extracted clock signal by the division ratio to generate the audio clock signal.

45. The video serializer of claim 43, wherein the audio core generates audio clock phase data as a function of the audio clock signal and embeds the audio clock phase data into the ancillary space of the parallel video input signal.

46. A method of automatically extracting audio data from a serial video signal of an unknown video standard, comprising the steps of:
receiving a serial video signal having embedded audio data;
converting the serial video signal into a parallel video signal;
automatically decoding the parallel video signal to identify a unique characteristic associated with a particular video standard;

automatically identifying a video formatting scheme based on the particular video standard;

automatically identifying a location of embedded audio data within the parallel video signal based on the identified video formatting scheme; and extracting the embedded audio data from the parallel video signal using the identified location.

47. The method of claim 46, comprising the additional steps of:

recovering a video clock signal from the serial video signal; and locking the serial video signal in phase with the video clock signal.

48. The method of claim 47, comprising the additional step of:

synchronizing the serial video signal with the recovered video clock signal to generate a reclocked serial video signal.

49. The method of claim 48, comprising the additional step of:

automatically processing the reclocked serial video signal based on the identified video formatting scheme to generate a serial video output signal in compliance with the particular video standard.

50. The method of claim 46, comprising the additional step of:

processing the parallel video signal based on the identified video formatting scheme to descramble the parallel video signal.

51. The method of claim 46, comprising the additional step of:

processing the parallel video signal based on the identified video formatting scheme to decode the parallel video signal.

52. The method of claim 46, comprising the additional step of:

processing the parallel video signal based on the identified video formatting scheme to word-align the parallel video signal.

53. The method of claim 46, comprising the additional step of:

processing the parallel video signal based on the identified video formatting scheme to detect errors in the parallel video signal.

54. The method of claim 53, comprising the additional step of:

processing the parallel video signal based on the identified video formatting scheme to correct the detected errors in the parallel video signal.

55. The method of claim 46, comprising the additional steps of:

generating an audio clock signal as a function of the video clock signal; and synchronizing the extracted audio data with the audio clock signal to generate an audio data output signal.

56. A video deserializer, comprising:

a video core that receives a serial video signal and converts the serial video signal into a parallel video signal;

a clock generator that generates an audio clock signal as a function of a known reference clock signal; and an audio core coupled to the video core and the clock generator that receives the parallel video signal from the video core and receives the audio clock signal from the clock generator, wherein the audio core locates and extracts audio data from within ancillary space of the parallel video signal and synchronizes the extracted audio data with the audio clock signal to generate an audio output signal;

wherein the video deserializer is fabricated on a single integrated circuit.

* * * * *